(12) United States Patent
Ellesson et al.

(10) Patent No.: US 6,459,682 B1
(45) Date of Patent: Oct. 1, 2002

(54) ARCHITECTURE FOR SUPPORTING SERVICE LEVEL AGREEMENTS IN AN IP NETWORK

(75) Inventors: Edward James Ellesson, Apex, NC (US); Roch Andre Guerin, Yorktown Heights, NY (US); Sanjay Damodar Kamat, Ossining, NY (US); Arvind Krishna, Somers, NY (US); Rajendran Rajan, Bronx, NY (US); Dinesh Chandra Verma, Millwood, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/056,526

(22) Filed: Apr. 7, 1998

(51) Int. Cl.[7] ............................................. H04L 12/26
(52) U.S. Cl. ...................... 370/235; 370/253; 370/401; 370/411; 370/468
(58) Field of Search ................................. 370/230, 232, 370/235, 253 R, 395, 352, 355, 356, 401, 396, 389, 231, 236, 409, 400, 412, 414, 429, 411, 238, 468; 709/232, 233

(56) References Cited

U.S. PATENT DOCUMENTS

| | | | | |
|---|---|---|---|---|
| 5,539,745 A | * | 7/1996 | Chang et al. ............. | 370/85.13 |
| 5,631,905 A | * | 5/1997 | Yano ........................... | 370/462 |
| 5,812,527 A | * | 9/1998 | Kline et al. .................. | 370/232 |
| 5,850,395 A | * | 12/1998 | Hauser et al. ............... | 370/398 |
| 5,898,669 A | * | 4/1999 | Shimony et al. ............. | 370/232 |
| 6,021,263 A | * | 2/2000 | Kujoory et al. ........ | 395/200.62 |
| 6,041,053 A | * | 3/2000 | Douceur et al. ............. | 370/389 |
| 6,041,166 A | * | 3/2000 | Hart et al. ............. | 395/200.68 |
| 6,044,062 A | * | 3/2000 | Brownigg et al. ........... | 370/238 |
| 6,052,734 A | * | 4/2000 | Ito et al. ...................... | 370/235 |
| 6,094,435 A | * | 7/2000 | Hoffman et al. ............. | 370/414 |
| 6,097,722 A | * | 8/2000 | Graham et al. .............. | 370/396 |
| 6,104,700 A | * | 8/2000 | Haddock et al. ............. | 370/235 |
| 6,115,373 A | * | 9/2000 | Lea .............................. | 370/355 |

* cited by examiner

*Primary Examiner*—Ricky Ngo
*Assistant Examiner*—Phuc Tran
(74) *Attorney, Agent, or Firm*—Whitham, Curtis & Christofferson, P.C.; Manny W. Schecter

(57) ABSTRACT

A method of controlling packet traffic in an IP network of originating, receiving and intermediate nodes to meet performance objectives established by service level agreements. Traffic statistics and performance data such as delay and loss rates relating to traffic flows are collected at intermediate nodes. A control server processes the collected data to determines data flow rates for different priorities of traffic. A static directory node is used to look up inter-node connections and determine initial traffic classes corresponding to those connections. The rates are combined with the initial traffic classes to define codes for encoding the headers of packets to determine their network priority.

18 Claims, 3 Drawing Sheets

SLA SCENARIO OF SEPARATE DIRECTORY & CONTROL SERVERS

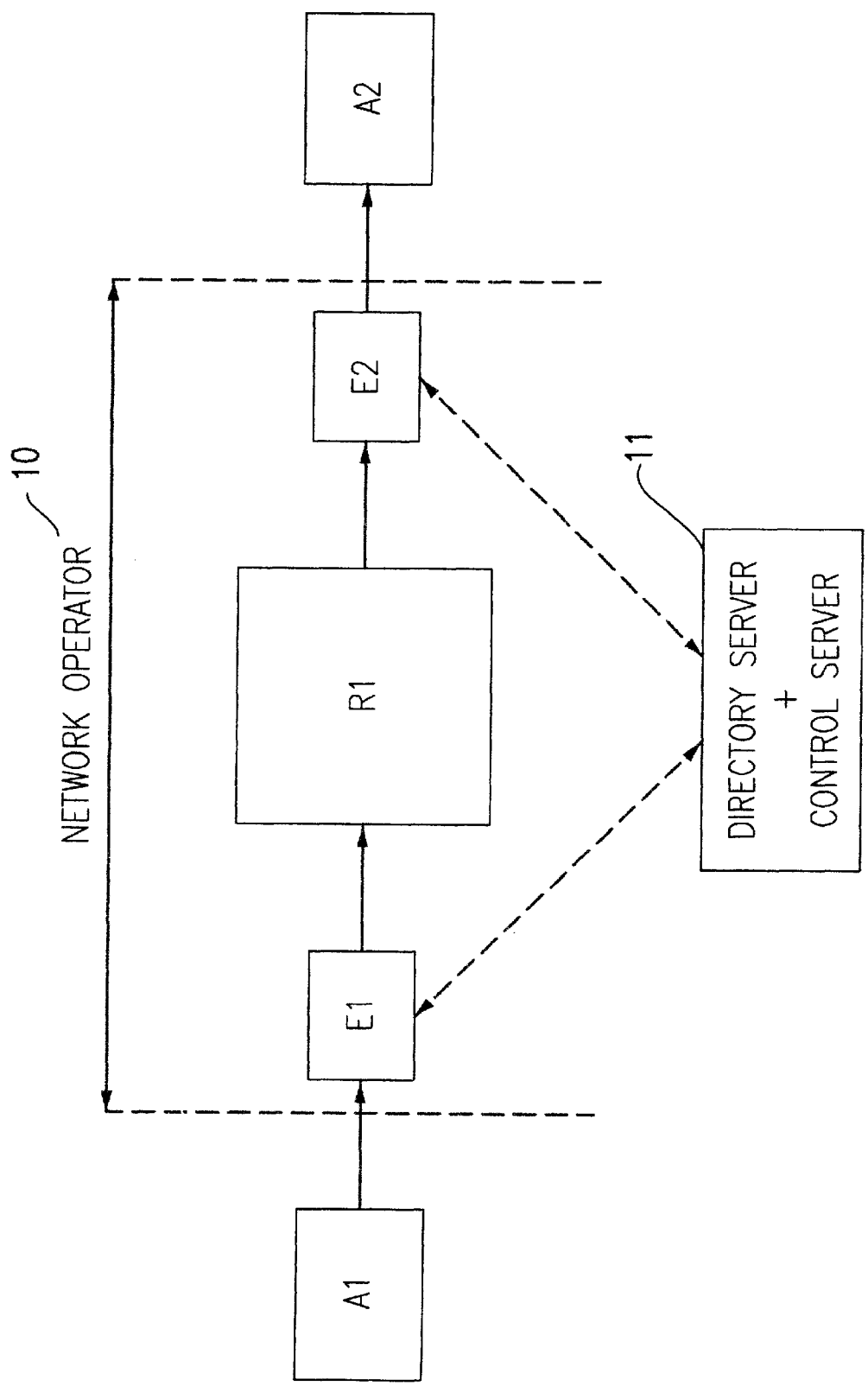
FIG.1A SLA SCENARIO OF INTEGRATED DIRECTORY & CONTROL SERVER

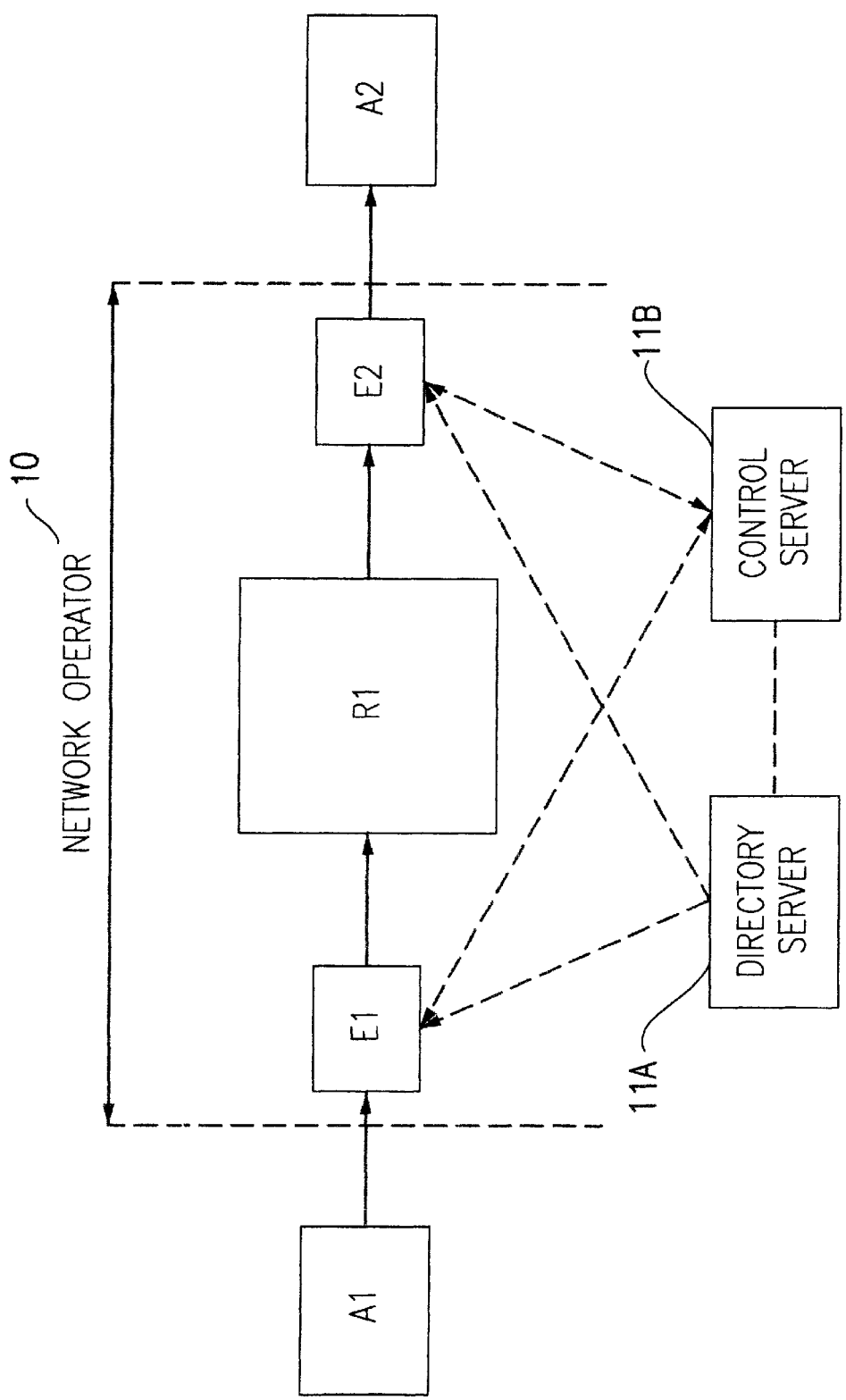
FIG.1B SLA SCENARIO OF SEPARATE DIRECTORY & CONTROL SERVERS

ARCHITECTURE FOR SUPPORTING SERVICE LEVEL AGREEMENTS IN AN IP NETWORK

BACKGROUND OF THE INVENTION

1. Field of the Invention

The present invention generally relates to architectures for delivering networking products across multiple platforms, and in particular to architectures for delivering Internet Protocol (IP) networking products which are enabled to support service level agreements.

2. Background Description

The operators and users of enterprise networks prefer that their networks be predictable and provide consistent performance. Predictability and consistency are often more important than the raw capabilities of the network, i.e. a network that provides a consistent medium throughput is often considered more desirable than a network which provides very high throughput at some times, but performs poorly at other times. For many business applications, it is important that transactions be completed in a predictable manner while the time taken for the transactions to complete is relatively unimportant (provided it does not exceed a reasonable limit).

Prior art solutions, such as SNA, provide network predictability by preconfiguring the network. This does not work in an IP network, because IP is dynamic and connectionless, and therefore relatively unpredictable. The typical enterprise network environment consists of several campus area networks interconnected by a wide area backbone network. The campus networks usually deploy high-speed links, and perform reasonably well. Congestion tends to occur in the backbone network, which consists of relatively slower speed point-to-point links, and in some of the campus networks which house the servers.

An approach is needed which will provide predictability on an IP backbone network, and do so for backbones with varying degrees of capability. If the network provider can predict the performance of the network, then he can implement service level agreements. A service level agreement is a formal contract entered into by a service provider and its customers. The service provider contracts to transport packets of electronic data between customer premise networks (branch offices, data centers, server farms, etc.) across the provider's backbone network with certain assurances on the quality of the transport. This is known as the Service Level Agreement (SLA). The SLA specifies customer expectations of performance in terms of parameters such as availability (bound on downtime), delay, loss, priority and bandwidth for specific traffic characteristics. An SLA includes acceptable levels of performance, which may be expressed in terms of response time, throughput, availability (such as 95% or 99% or 99.9%), and expected time to repair.

SLAs vary greatly from one network to the next, and from one application to another running on the same network. They are normally based on some level of expected activity. For example, if a large airline wants to ensure that the lines at the ticket counter do not get overly long due to poor response time at the ticketing terminals, some estimate must be made of expected workload, so that the network administrator can be prepared with the necessary resources to meet that workload and still remain compliant with the performance terms of the SLA.

Managing an SLA is an important task because of the revenue implications of failure to support mission-critical business applications. The problem is exacerbated due to diversity of the traffic and due to poor and varying degree of service differentiation mechanisms within the backbone networks. Commercially significant traffic must be prioritized above workloads which do not have a critical time dependency for the success of the business. Many of these workloads in an IP environment are far more volatile than those which have traditionally been encountered in the prior art, e.g. in native SNA environments. In order to meet customer requirements in this environment, a service provider must provide a large excess capacity at correspondingly high charges.

This situation dramatizes the need for effective tools which can monitor the performance of the IP network or system delivering a service over the IP network. While SLA management tools already exist in the native SNA VTAM environment, these tools do not generally exist for IP backbones. Also, there is a need for effective controls which allow the service provider of an IP network to manipulate the priority of the various workloads to be managed.

SUMMARY OF THE INVENTION

It is therefore an object of the present invention to provide support for service-level agreements in a corporate itinerant or an ISP-controlled portion of the Internet.

It is also an object of the invention to provide tools which can monitor the performance of an IP network as measured against multiple SLA agreements.

It is a further object of the invention to provide effective controls which allow the service provider to manipulate the priority of the various workloads subject to SLA agreements.

Another object of the invention is to provide means for achieving network predictability which are adequate to implement a variety of SLA agreements over IP backbone networks halving a variety of capabilities.

It is yet another object of the invention to provide network traffic control tools enabling optimum allocation of network resources and minimizing the need to provide excess capacity in order to implement a variety of SLA agreements.

This invention discloses an architecture (SLA architecture) which organizes the key components, the specific function placements and communication mechanisms so as to enable efficient means of implementing new tools which greatly facilitate both development and enforcement of an SLA. Further, these advantages are even more significant when the backbone network such as current IP-based networks provide very little means for such service differentiation.

The key components of a service level agreement are availability and responsiveness. Availability is maintained by managing network connectivity in the presence of failures, and responsiveness by maintaining a satisfactory Level of network performance. In an IP network, availability is largely taken care of by the adaptive routing mechanism used by IP, but responsiveness needs to be managed. The schemes that make the network predictable provide mechanisms that can estimate the responsiveness of an IP network, and thereby assist in implementing service level agreements. The approach taken in accordance with the present invention to provide predictability in an IP network is to provide a quasi-static configuration which adapts to longer term fluctuations of traffic and relies upon the dynamism of IP to react properly to short term fluctuations and congestion.

Quasi-static adaptations may be viewed as dynamic in relation to longer time scales. By extending the adaptive time scales to relatively gross periods of hours, days and weeks, as appropriate, a quasi-static configuration enables the network to modify allocation of resources in such a manner as to lower the load on the network, in contrast to prior art techniques such as Response Reservation Protocol (RSVP) which allow necessary resources to be requested bit impose a higher signalling load on the network.

The invention involves controlling packet traffic in an IP network of originating, receiving and intermediate nodes to meet performance objectives established by service level agreements. To implement the invention, traffic statistics and performance data such as delay and loss rates relating to traffic flows are collected at intermediate nodes. A central server processes the collected data to determines rates for different priorities of traffic. A static directory node is used to look up inter-node connections and determine initial traffic classes corresponding to those connections. The rates are combined with the initial traffic classes to define codes for encoding the headers of packets to determine their network priority.

BRIEF DESCRIPTION OF THE DRAWINGS

The foregoing and other objects, aspects and advantages will be better understood from the following detailed description of a preferred embodiment of the invention with reference to the drawings, in which:

FIG. 1a is a block diagram of a service level agreement scenario having a combined directory server and control server; FIG. 1b shows the same scenario having a directory server distinct from the control server.

DETAILED DESCRIPTION OF A PREFERRED EMBODIMENT OF THE INVENTION

Figure 2:
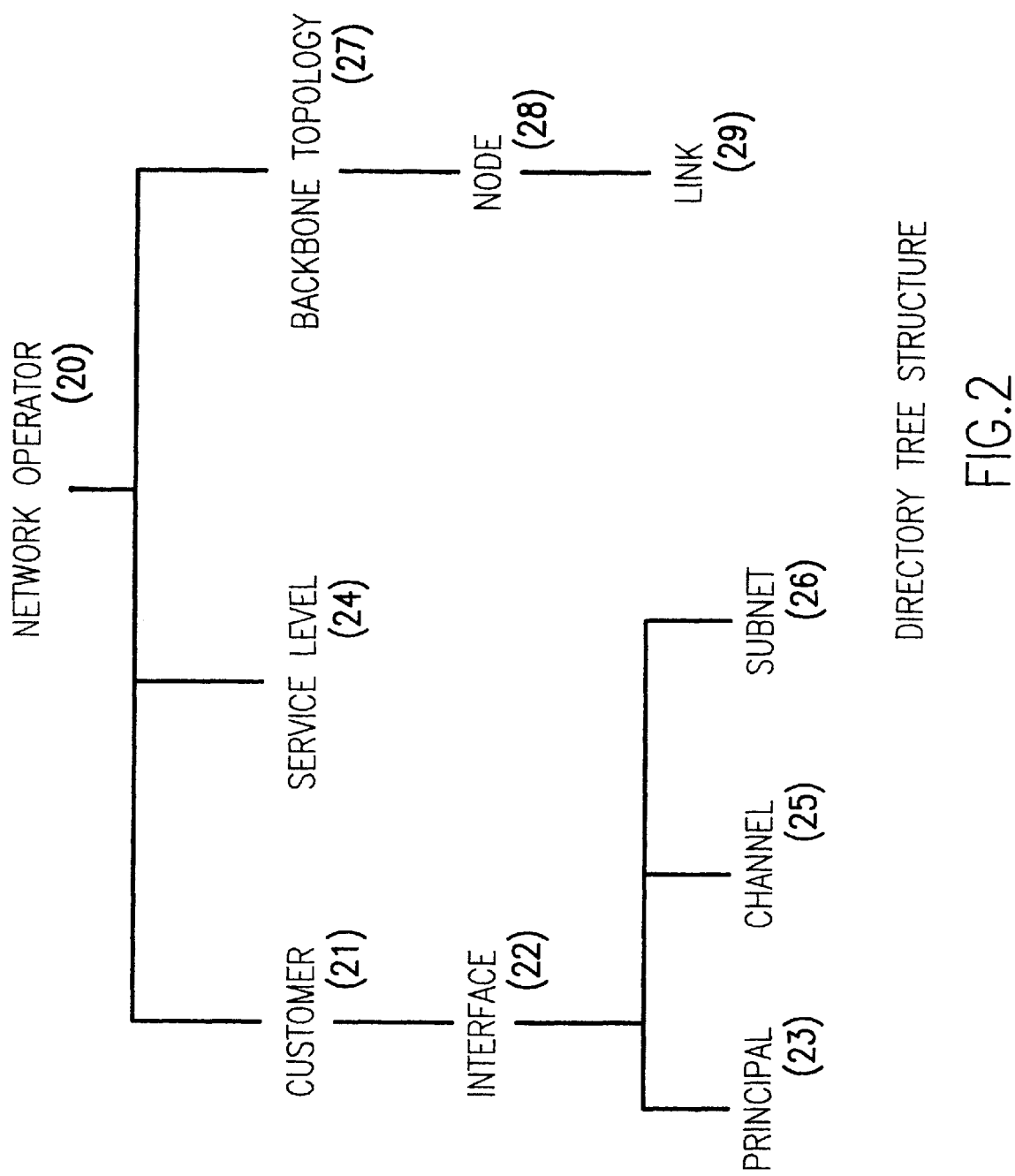
FIG. 2 is an illustration of a hierarchical structure of a directory that can be used for Service Level Agreements.

Referring now to the drawings, and more particularly to FIG. 1a, there is shown a Service Level Agreement scenario, with a Network Operator 10, Customer Premise Networks A1 and A2, Edge Devices E1 and E2, a Network Router R1 and a Directory Server/Control Server 11. FIG. 1b shows the same scenario, but with Directory Server 11A distinct from Control Server 11B.

The main components of the proposed architecture are:

Edge Device(s),

Control Server(s),

Directory Server(s),

Edge Device to Control Server Protocol,

Edge Device to Directory Server Protocol,

Control Server to Directory Server Protocol, and

End Host Protocol.

These will now be discussed in detail.

An Edge Device in the SLA architecture is a module that interfaces a customer premise network with the backbone network. (Currently, backbone networks vary widely in their resource management and service differentiation capabilities (e.g. an IP network with support for resource reservation and/or support for differential services using weighted fair queuing (WFQ) or class based queuing (CBQ), an ATM or Frame Relay network supporting switched virtual circuits with committed rates, etc). Such heterogeneity is expected to continue as vendors of networking equipment seek to differentiate their products. In such an environment, edge devices play the role of adapting the traffic entering the backbone network to the specific capabilities provided by the network in order to ensure that the SLA conditions are met efficiently.

An Edge Device may reside on a stand-alone processing device or be integrated into the border router that acts as a gateway to the service provider network. In either case, all packets originating in one customer premise network and destined for another pass through two Edge Devices components; i.e., the ingress Edge Device E1 at the interface between the backbone network and the source customer premise network A1, and the egress Edge Device E2 at the interface between the backbone network and the destination customer premise network A2. Note that customer premise networks A1 and A2 are not transit networks.

The ingress Edge Device E1 obtains some or all of the following information, either carried in the packets received from the customer premise network, or obtained through a lookup based on information stored at the edge device:

ingress interface, source address, source port, destination address, destination port, protocol id, Class of Service identification, contents of packet, header fields in transport protocol.

An ingress Edge Device E1 performs some or all of the following operations on packets that it intercepts as they leave a customer premise network A1 and enter the backbone network.

1. Classification: Packets are categorized into separate streams based on a number of criteria that depend on the terms of SLA and the network capabilities. The Edge Device uses a set of classification rules to determine the appropriate service level category to which the packet is assigned. These rules may be configured in the Edge Device or obtained by querying a Directory Server. The details of the latter mode of operation will be discussed below in the context of the Directory Server operation. In a preferred implementation, only the egress edge device classification and class of service classification are necessary to provide service level agreements. For finer granularity control, the other classifications (path, channel, flow) can also be used.

(a) Egress Edge Device Classification: The ingress Edge Device E1 that receives the packet from the customer premise network A1 obtains the identity of the remote or egress Edge Device E2 that the packet is expected to traverse before being delivered to the destination customer premise network A2, either directly from the packet or based on a lookup.

(b) Path Classification: The ingress Edge Device E1 determines the path that is expected to be traversed across the backbone network by the packet.

(c) Class of Service (classification: Packets with similar designated service categories are considered to belong to same stream. The class of service may be determined directly from information carried in the packet or may be based on other header fields carried in the packet, or based on a set of classification rules at the Edge Device.

(d) Channel classification: A channel is defined as a stream of packets that have the same ingress and egress edge devices, that are expected to follow the same path through the network and have the same Class of Service. The present invention also covers the case where all packets expected to traverse the same remote edge device are classified into the same channel, irrespective of the expected path within the network.

(e) Flow classification: A flow is the basic packet stream unit over which a service level agreement may be specified. Typically, all packets in a flow belong to the same channel.

2. Packet Transformation: The edge-device is responsible for changing packet formats so that the backbone network is capable of mapping the transformed packet into the right class for purposes of scheduling and buffer management. Two common forms of transformation are 1) to change the contents of the TOS (Type of Service; field in the IP header; or 2) to encapsulate the packet with an additional IP header. When the backbone network supports a mechanism such as WFQ or CBQ which operates on the TOS byte field, the edge-device changes the contents of the TOS byte to a value specific to the class of service assigned to a packet. When the backbone network supports a mechanism such as RSVP based reservation, or WFQ/CBQ which operate on the basis of port numbers in the transport header, an encapsulation into an additional IP header is required. The external IP header would contain the right fields which would permit the routers in the backbone network to classify it easily.

Packet transformation may need to be done both at the entry and the egress edge-device for a packet. When only the TOS byte value is changed, only the entry edge-device needs to transform the packet. However, when an additional IP header is used for encapsulation, the entry edge-device transforms the packet by adding the external IP header, and the egress edge-device transforms the packet by removing the external IP header and restoring the original packet.

3. Scheduling: Scheduling refers to the differential treatment given to different flows in terms of access to link bandwidth. Typically, each outgoing flow at the edge de(vice is assured of the opportunity to share available link bandwidth fairly with other contending flows. In this context, it becomes important for Edge Devices E1 or E2 to schedule packets awaiting acess to the link, sending them out in a certain order, perhaps different from the order in which the packets were received. Scheduling may also aggregate similar flows and arbitrate amongst the aggregates.

4. Buffer management: Another resource at the edge device that needs to be shared is buffer space. Buffer management refers to the operations of the edge device to assure a fair treatment of different flows in terms of their access to this resource, based on their priority and current usage of buffers.

5. Policing: The SLA specifies the service levels that individual flows should receive as long as the traffic generated by these flows is within specified bounds. The policing functionality checks for violation of the traffic contract by flows and may penalize certain applications by degrading their service level temporarily (marking/dropping all such packets).

6. Pacing: During congestion states within the network, certain channels may be affected because they use congested portions of the network. As will be discussed later, the Control Server component of the SLA architecture is capable of detecting both the congestion state as well as affected flows. Under the directive of the control server, an Edge Device will regulate the rates of affected active channels to alleviate the impact of congestion.

7. Statistics collection: An Edge Device maintains various counters to monitor the traffic rates of flows in either direction.

8. Traffic prediction: This involves using the collected statistics to forecast near-term traffic (and the consequent resources requirement) of flows that will enter the backbones network from the Edge Device.

9. Performance monitoring: This includes estimating the bandwidth, delay and loss characteristics of selected flows. This function will be realized either using additional probe packets or using header fields if data packets are encapsulated before entering the backbones network. The frequency of probing is adjusted according to the SLA terms while maintaining a tight control over the overhead introduced by such additional traffic. The latter is achieved by ensuring that the overhead of probing does not exceed a certain percentage of the actual data traffic which is monitored by the statistics collection function. Performance monitoring can be done at the egress edge device only, or at a combination of the ingress and egress edge devices.

10. Policy control: This covers a variety of operations performed at the edge of the network, including access control, security, billing, etc. Network administrators may wish to allow or disallow the use of network resource based on the origin, destination or protocol used by the packet stream. In addition, policy control may involve authentication of applications and their desired service levels in an environment where end-hosts are capable of signaling their resource requirements/service prior-ities directly to the network. This function involves communication with a directory/policy server described below.

2. Control Server

A control server in the SLA architecture is a module that acts as a repository of dynamic information (in accordance with the above referenced "quasi-static" approach involving adaptive time scales), e.g. resource utilization within a portion of the backbone network. Based on the knowledge of the topology, resource utilization and service level agreements with all customer premise networks, the control server computes the allocation of backbone network resources, and informs the edge devices of the pacing that must be done on various channels. To this end, the control server may perform some or all of the following functions:

1. Network Topology Learning: The control server becomes aware of the topology and total resource availability at network elements. These network elements may include various edge devices, routers, switches, bridges or links between other network elements. The resources at the network elements may include bandwidth, packet processing speeds, buffers, and protocols to manage these resources. The control server can obtain this information directly, i.e., through participation in routing protocols, or network management protocols or through configuration; or indirectly, i.e. from the Directory server or edge devices.

2. Updating Directory server: If the Control Server obtains the topology and network resource information directly then it updates the Directory Server accordingly.

3. Network Device configuration: In the event that the resource management protocols at various network devices are capable of remote configuration then the control server may take on the task of configuring them accordingly. In particular, the control server may adjust the parameters of the link bandwidth scheduling protocols at various routers. These adjustments will be propagated automatically, without the need for rebooting the devices thereby reconfigured.

4. Determining routing topology: Periodically, the control server obtains routing tables and other routing information relevant, to the routers and edge devices, in order to remain aware of the latest routing topology of the backbone network. This may be done through participation in routing protocols or polling routers/edge-devices through network management protocols.

5. Polling Edge Devices for Channel Statistics: Periodically, the control server polls the edge devices, and obtains the current set of active channels, the bandwidth utilization of these channels, other traffic statistics that are relevant to network resource use, as well as any estimates of future resource use computed by the edge devices.

6. Load balancing: If the control server is capable of determining the routing in the network, then it uses this capacity to balance the load in the network.

7. Congestion avoidance: The control server may detect that certain network devices, such as routers and links, are overloaded. In this case the control server will compute the channels that are over-using their resource allocations and inform the appropriate ingress edge devices corresponding to these channels, advising them to pace the channels.

3. Directory Server

The directory server is responsible for maintaining information which is relatively static. It is organized as per the specifications of The Directory: Overview of Concepts, Models and Service, CCITT Recommendation X.500, 1988. Information in the directory server is used to maintain information about classifying packets into one or more service-levels, to maintain policy information regarding applications, and to maintain information about the different service-levels that is to be expected of different customers.

The directory server is represented as an X.500 directory and is accessible via the LDAP protocol (*Lightweight Directory Access Protocol RFC* 1777, March 1995, by W. Yeong, T. Howes and S. Kille). It maintains three main types of information:

Information about the policy rules for applications and users, mapping traffic to one of the several service levels of the class.

Information about the mapping of service-levels to the appropriate set of performance requirements.

Information about the topology of the network, and the characteristics of the communication channels in the network.

All the entries relevant to Service Level Agreements are rooted at the entry identifying the Network Operator 10. A hierarchical structure of the directory that can be used for Service Level Agreements is illustrated in FIG. 2.

Each entry in the directory belongs to one of the categories shown above, and is assigned a relative distinguished name at each step of the path it belongs to.

The category Network Operator 20 identifies the organization that is responsible for this portion of the network. It contains all the standard attributes associated with an organization in a standard X.500 directory.

The Customer category 21 identifies different customers supported by the network operator. Each customer has all the attributes associated with an organization or an individual. Additionally, it contains a list of all the interfaces associated on which the customer packets can be received. These interfaces are identified by their unique IP addresses within the operator network.

The Interface category 22 identifies an interface through which a customer may send its traffic. The access to an interface might be via dial-up lines or via a directly connected network. An interface is identified by its IP address, and has a default service level which is assigned to its owners. It also contains the name of the owner and the physical machine on which it is installed. An interface entry also contains the time when it was last updated.

The Principle category 23 identifies the type of rules that are used to determine the Service Level 24 to which traffic should be assigned. Each principle is a subset of the traffic that will be assigned to a specific interface. Each entry in this category has a type attribute which determines whether the principle can be identified by looking at the Type of Service (TOS) byte in an incoming IP packet, whether it can be identified by looking at IP header information only, whether it can be identified on the basis of IP and TCP/UDP headers, or if the principle is identified by means of an URL or by other upper layer information. It identifies the interface to which the principle is applicable. It may be applicable to more than one interface. A special interface address (IP addr 0.0.0.0) is used to identify a principle that is applicable to all the interfaces belonging to a particular customer.

The Service Level attribute 24 identifies the service level to which the traffic matching the specifications of the principle could be mapped onto.

The specification of the principle is identified by the type of principle. If the principle type is interface only, no further specification is needed. All packets coming on the specified interface are mapped to the specified service-level. If the principle type is IP header only, it may contain the TOS byte of the incoming packet which defines the principle. All packets on the interface with specified TOS byte value are mapped onto the specified service level. If the principle type contains IP and TCP/UDP headier, the additional attributes would be the source-destination IP addresses and the TCP/UDP port numbers which would need to be specified.

The Channel category 25 identifies the different logical connections that are supported by the network operator for a particular customer. The channel contains the source and destination interface addresses, as well as the required performance and traffic level that should be supported on the channel. Other attributes of the channel can also be stored in this entry. Both the desired and the actual observed performance of the channel is stored in this entry.

The Subnet category 26 identifies the topology behind the interface. The subnet is characterized by an IP address and a subnet mask. Multiple subnets that belong to the customer, and are accessible through the interface, are enumerated here.

The Service Level category 24 identifies the different service-levels that are offered by the network operator. An entry in this category would contain the service-level name, and the method used to encode the service in the backbone network. The method used may specify the TOS byte to be used by packets, or a specific port and protocol within which such traffic should be encoded. It also contains the performance specifics required for service-level, including the round-trip delay or loss-rate. The performance specifics are specified as an incremental add-on to the basic performance that is determined by the properties of the source and destination address for a specific communication channel. The entry also specifies the action to be taken when traffic belonging to this service-level is found to be in violation of an assigned traffic rate. The action could take the form of dropping packets, buffering packets, downgrading packets to a different service-level, or downgrading sessions to a different service-level. In the latter case, the next service level also needs to be specified.

The Backbone Topology class 27 is used to store the topology of the network and the network state. Below its hierarchy, one would find the different nodes 28 and links 29 which will constitute the backbone network, and their state, including their present utilization, their capacity etc. In some implementations, it may not be necessary to support the full directory tree structure shown in FIG. 2. For example, the backbone topology need not be stored in cases where the control server determines backbone topology dynamically.

Similarly, if the network is dedicated to a single customer, the customer class 21 can be eliminated.

4 Edge device—Directory Server Protocol

The system can operate in one of two modes. In the first mode, the directory server and the control server are integrated, and are accessed using a directory access protocol such as LDAP. In the second mode, the directory server and the control server are different entities (which may be co-located on the same machine), each supporting a different set of protocols. The directory server would always use a protocol such as LDAP, although the control server is likely to use a different protocol to counter the difficulties associated with managing highly dynamic data using LDAP.

In both of the modes, the edge-device registers itself with the Directory Server when it is initiated. The edge-device Would identify the interface address to which it is attached, and registers the subnets behind it with the directory server. It would also obtain the list of other interfaces belonging to the same customer, and the subnets associated with them from the directory server. The edge-device would then query the directory server for the different principles that are defined for it. These principles provide the rules that map the traffic on the network from the edge-device to the different levels of service in the backbone network. The set of channels belonging to the interface are also queried by the edge-device. These provide the values for the different traffic rates associated with each channel. Any other policy information is also obtained by querying the directory server.

When the directory server is integrated with the control server, the edge-device would periodically query the directory for the different channels for which an interface on the edge-device is an end-point. For these channels, the edge-device would obtain the specified maximum traffic to be placed in the network, as well as the specific performance expected of the channel. The edge-device only sends out packets according to these specifications into the network. The edge-devices would also monitor the performance of the packets, and update the status of the channel in the directory as to whether the performance specs are being met or not.

5. Edge Device—Control Server Protocol

When the control server and directory server are integrated, the protocol used between the two is as defined in the previous section. However, when the control sever is a different entity, a different polling protocol is used by it to monitor the state of the network.

When it is initiated, the edge-device is required to register with the control server. The control server, at periodic intervals, polls each of the edge-devices to obtain the performance and traffic characteristics of the channels belonging to each edge-device. The control server would use this information to determine which edge-devices, if any, should be regulated, and allocate the pacing rate to the ones being regulated. The control server uses an adaptive dynamic algorithm to determine the rates, and the set of channels which need to be paced. A set of channels may need to be paced together since they all share the same bottleneck link. This mapping information is also sent by the control server.

The rates to be assigned to different channels can be computed by the following adaptive dynamic algorithm, where the network state is collected at regular periods and the algorithm is invoked at the end of each period. The algorithm seeks to determine the maximum utilization of a network node/link which would satisfy the performance requirements of all channels:

1. For all the channels in the network, determine the following quantities: a) mean actual traffic observed in the previous period; b) forecasted mean traffic expected for the next period; c) whether the channel's performance requirements were satisfied in the last period.

2. On the basis of the foregoing collected information, determine the utilization of each node and link in the network for the last period. The utilization is given as the ratio of actual traffic in the last period to the traffic capacity of the node/link.

3. For all channels whose performance was not met in the previous period, identify the node/link with the highest utilization long its path. For this path, revise the maximum utilization of the node/link to be the lower of the current maximum utilization and the actual utilization.

4. If all channels through a node/link have met their performance in the last period, revise the maximum utilization of the node/link to be the higher of current maximum utilization and the actual utilization.

5. For each channel for which the maximum utilization of each node/link along its path is larger than the predicted utilization for the next period, make its assigned rate be the same as the predicted rate.

6. For all nodes/links for which the predicted utilization in the network exceeds the maximum utilization in the network, repeat steps 7 through 8.

7. Assign the assigned rate to the channels passing through the node by the ratio of the maximum utilization to the actual utilization.

8. Recompute the predicted utilization of the nodes/links in the network.

6. End Host Protocol

In the normal mode of operation, the end host would not be expected to participate in any interaction with the directory server or the control server. However, new applications which are aware of the directory server can use a protocol to query the directory and obtain their service-level information. Some of the applications may be capable of marking their service-levels in the end-host, and the edge-device function would be to verify that the end-host marking is consistent with the schema as defined by the directory. In some cases, the end host may update the entries in the directory which would be queried by the edge-device to obtain the most current rules.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of controlling packet traffic in an IP network, comprising the steps of:

at one or more edge-nodes in a connectionless network, identifying inter-node connections and determining their corresponding initial traffic classes and traffic flows by looking up said initial traffic classes in a relatively static directory server, said relatively static directory server having a configuration that adapts to longer term fluctuations of traffic;

transforming packets belonging to said inter-node connections to encode information about said traffic classes; and for one or more of said traffic flows, regulating the transmission rate of packets belonging to each of said one or more traffic flows to meet performance objectives according to service level agreements.

2. The method of claim 1, wherein said regulation of transmission rate includes setting an upper limit for said rate.

3. A method of controlling packet traffic in an IP network, comprising the steps of:

at one or more edge-nodes in a connectionless network, identifying inter-node connections and determining their corresponding initial traffic classes and traffic flows;

transforming packets belonging to said inter-node connections to encode information about said traffic classes; and for one or more of said traffic flows, regulating the transmission rate of packets belonging to each of said one or more traffic flows to meet performance objectives according to service level agreements, wherein said regulation of transmission rate includes setting an upper limit for said rate, and wherein said regulation of packet transmission rate includes determining said rate by the further steps of:
at edge-nodes, collecting traffic statistics and performance data relating to a traffic flow;
processing the information from said collecting step to determine data flow rates for different priorities of traffic;
repeating said collecting and processing steps at periodic intervals, and propagating said rate to individual nodes on said network in a quasi-static mode.

4. The method of claim 3, wherein said regulation of rates is done by a control server which dynamically tracks traffic in the network and determines rates for traffic flows at one or more network nodes, said network nodes being either edge-nodes or intermediate nodes.

5. The method of claim 4, wherein said control server configures devices on the network to efficiently support the rates for traffic flows at network nodes, said configuration being done when new rates are computed at the control server.

6. The method of claim 3, wherein said regulation of packet transmission rate includes determining said rate by storing and querying entries in a directory server.

7. A method of controlling packet traffic in an IP network, comprising the steps of:

at one or more edge-nodes in a connectionless network, identifying inter-node connections and determining their corresponding initial traffic classes and traffic flows;

transforming packets belonging to said inter-node connections to encode information about said traffic classes; and for one or more of said traffic flows, regulating the transmission rate of packets belonging to each of said one or more traffic flows to meet performance objectives according to service level agreements, wherein said regulation of transmission rate includes setting an upper limit for said rate, and wherein said initial traffic classes and said encoding are changed by edge-nodes to form new traffic classes and new encoding for said inter-node connections.

8. The method of claim 7, wherein for each of one or more of said inter-node connections said new traffic class is of a lower priority than said initial traffic class, and said change to said new traffic class is made when said inter-node connection is sending packets in the network at a rate beyond said upper limit.

9. An apparatus for controlling packet traffic in an IP network, comprising:

at one or more edge-nodes in a connectionless network, means for identifying inter-node connections and determining their corresponding initial traffic classes and traffic flows, said means for determining said initial traffic classes further comprising means for looking up said initial traffic classes in a relatively static directory server, said relatively static directory server having a configuration that adapts to longer term fluctuations of traffic;

means for transforming packets belonging to said inter-node connections to encode information about said traffic classes; and for one or more of said traffic flows, means for regulating the transmission rate of packets belonging to each of said one or more traffic flows to meet performance objectives according to service level agreements.

10. An apparatus as in claim 9, wherein said means for regulating the packet transmission rate includes means for setting an upper limit for said rate.

11. An apparatus as in claim 10, wherein said regulating means further comprises:

means for collecting statistics about traffic flows; and
means for collecting performance information about traffic flows.

12. An apparatus as in claim 10, further comprising means for changing the initial traffic class of an inter-node connection to a new traffic class.

13. An apparatus as in claim 11, wherein said regulating means further comprises means for determining if the service level agreements of a traffic flow are being satisfied.

14. An apparatus as in claim 11, wherein said rates for said traffic flows are regulated according to said traffic statistics and said performance information.

15. The method of claim 9, wherein said identifying and transforming means are implemented at edge devices.

16. An apparatus for computing the rates for traffic flows at individual nodes in an IP network, comprising:

means for determining the routing topology of a connectionless network;

means for collecting statistics about traffic flows in the network;

means for collecting performance information about traffic flows in the network; and means for combining said routing topology with said statistics and said performance information to determine the rates for traffic flows in the network to meet service level agreements, wherein said combining means is accomplished at periodic intervals and said rates are disseminated to network nodes in a quasi-static mode.

17. An apparatus as in claim 16, further comprising means for configuring network devices to optimally support said traffic rates.

18. A method for optimizing resource utilization among customers of an IP network, comprising the steps of:

defining service level agreements for each said customer;
establishing a control server as a dynamic repository of network information, said information including resource utilization, topology, and service level agreements;

receiving said topology information at said control server, said topology information including edge devices through which said customers connect to the network;

establishing a directory server as a quasi-static repository of network information, said information including policy rules for mapping traffic to service levels, and for mapping service levels to performance requirements;

monitoring traffic on said network at each of a plurality of edge devices, said edge devices operating to classify said traffic;

using said control server to compute the allocation of backbone network resources and issue pacing instructions to said edge devices; and propagating directory server information to network devices automatically and without reconfirming the network, said propagation being accomplished dynamically over long time scales, wherein said network is connectionless.

* * * * *